United States Patent

Ho et al.

[15] 3,658,147
[45] Apr. 25, 1972

[54] DEVICE FOR MEASURING ACOUSTIC QUANTITIES

[72] Inventors: Louis T. Ho, Lanham; Robert J. Flaherty, III, Glen Burnie, both of Md.

[73] Assignee: The United States of America as represented by the Secretary of the Navy

[22] Filed: June 29, 1970

[21] Appl. No.: 50,767

[52] U.S. Cl. .................................................. 181/.5 AP
[51] Int. Cl. ............................................... G01v 13/00
[58] Field of Search ............................... 181/.5 AP

[56] References Cited

UNITED STATES PATENTS 3,098,211  7/1963  Gerber.................................181/.5 AP
2,836,656  5/1958  Schultz..................................181/.5
3,343,627  9/1967  Schroeder............................181/.5
3,171,095  2/1965  Gennari................................181/.5
3,288,241  11/1966  Bangcroft et al. ................181/.5
3,270,833  9/1966  Schroeder............................181/.5

Primary Examiner—Benjamin A. Borchelt
Assistant Examiner—N. Moskowitz
Attorney—R. S. Sciascia and Q. E. Hodges

[57] ABSTRACT

A device for measuring and displaying four different acoustic quantities in a fluid medium. The specific acoustic quantities are: acoustic pressure; particle acceleration; acoustic impedance; and acoustic power density. All of these quantities are determined simultaneously and each is instantly displayed as a function of the driving frequency of an excitation source in the fluid medium.

5 Claims, 5 Drawing Figures 3,658,147

PATENTED APR 25 1972

INVENTORS
LOUIS T. HO
ROBERT J. FLAHERTY, III
BY
*Hodges*
ATTORNEY

INVENTORS
LOUIS T. HO
ROBERT J. FLAHERTY, III 3,658,147

DEVICE FOR MEASURING ACOUSTIC QUANTITIES

The invention described herein may be manufactured and used by or for the Government of the United States of America for Governmental purposes without the payment of any royalties thereon or therefor.

BACKGROUND OF THE INVENTION

The study of various types of acoustic filters for attenuating the fluidborne noise in a piping system has long been part of the Navy's overall effort to reduce the self-noise generated in a ship. In order to better predict the low-frequency performance of a given filter in a practical piping system, an effective means is needed for evaluating its characteristics taking into consideration the interactions between the filter and other components of the system. The instrumentation system of this invention can readily provide such a means by determining the acoustic impedance and the energy loss in the filter installed in such a system.

In addition, the invention relates to the measurement of various acoustic quantities of a fluid medium and, in particular, to the measurement of acoustic pressure, particle acceleration, acoustic impedance and acoustic power density. By studying the frequency distributions of these four quantities, valuable information can be obtained concerning the phenomena of acoustic wave propogation in such a fluid medium. The prior art includes devices which can determine these particular acoustic quantities but only on a separate basis. For example, sound pressure can be measured by a hydrophone and particle acceleration can be obtained from a pressure-gradient hydrophone. Additionally, the usual technique for determining the complex acoustic impedance of a sample material involves the measuring of the complex reflection coefficient at each discrete frequency in a socalled "impedance tube" in which one end is terminated by the sample material. At low frequencies, however, such a technique is not too feasible to use, because a tube of very long overall length is required to obtain desired reflection coefficients at large wavelengths. Thus, in the low frequency range, the acoustic impedance measuring capabilities of this invention should be a most suitable substitute for the "impedance tube" technique in determining the complex acoustic impedance of a damping material for underwater use.

SUMMARY

The instant invention overcomes the aforementioned problems of the prior art by providing an instrumentation system capable of obtaining instantly and simultaneously the frequency plots of sound pressure, particle acceleration, specific acoustic impedance and acoustic power density in a fluid medium, all of which are measured at a point in a plane-wave sound field inside a fluid system. This invention can be used, for example, to determine: (1) the performance of a given acoustic filter installed in a piping system; (2) the complex wave propagation constant in a damping material for underwater use; (3) the dynamic viscosity of a fluid; and (4) the acoustic energy flow in a fluid.

Accordingly, the instant invention comprises a small, dual sensor, probe-type device and its associated electrical instrumentation system for measuring, among other things, the acoustic impedance and energy flow inside a piping system. Such information is useful in studying sound propagation within a piping system and acoustic energy transfer between a fluid and the pipe walls. The usefulness of this information is based upon the theory that, in a plane-wave sound field the instantaneous sum and difference of acoustic pressures at two points separated by a small distance are proportional, respectively, to the pressure and particle velocity at the center of the separation.

There are several unique features and advantages present in the instant invention;

a. It provides instantly and simultaneously graphs of the acoustic pressure, particle acceleration, acoustic power density, and acoustic impedance at a point of interest as a continuous function of the driving frequency. The long, tedious labor of taking the data and plotting them by hand is thus completely eliminated.

b. The dual pressure-sensor device described in this invention is small in size and streamlined in shape. Thus, in the low frequency range of operation, no appreciable error in measurements will result from the diffraction effect caused by its presence in the sound field.

c. The dual pressure-sensor device described in this invention is mobile in its maneuverability so that it can be used anywhere inside a fluid system.

d. The pressure sensors in the probe device are aligned along the axis of the unit and can be made bidirectional so that the device is characterized by its ability to discriminate against discrete sources of interfering sound, to reduce the reverberation effect, and to improve the ratio of the acoustic signal to the background noise.

e. The instrumentation system as described in this invention is best suitable for low frequency operation (below 2 K Hz). Thus, when used in a piping system for example, it does not require pipes of long overall length to perform low frequency measurements for various acoustic quantities.

f. The instrumentation system can be used to evaluate acoustic properties in a damping material, namely the attenuation constant and the complex sound velocity, both of which are functions of frequency, and to evaluate any acoustic energy loss when a noise reduction device (i.e., acoustic filter) is used.

Accordingly, it is an object of the present invention to provide a system for measuring and displaying certain acoustic quantities in a fluid medium.

An additional object is to determine the acoustic impedance of an acoustic filter.

Another object of this invention is to provide an acoustic measuring system which is suitable for low frequency operation.

A further object is to provide an acoustic instrumentation system which employs a dual-sensor acoustic-pressure sensing probe.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENT

Figure 1:
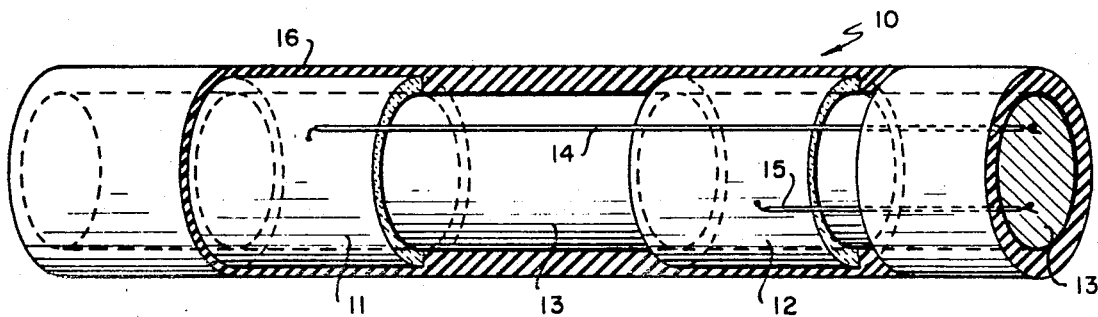
FIG. 1 illustrates a partially sectioned elevation of a dual-sensor acoustic-pressure sensing device.

The concept of the instant acoustic measuring device is based on the theory that, in a plane-wave sound field, the instantaneous sum and difference of the acoustic pressures at two points separated by a small distance are proportional, respectively, to the acoustic pressure and particle velocity at the center of the separation. By definition, the specific acoustic impedance at a point in a plane-wave sound field is a ratio of the acoustic pressure to the normal component of the particle velocity at that point. In terms of the two acoustic pressures at Points A and B, separated by a small distance, d, the specific acoustic impedance at the center of separation can be expressed approximately as $$Z \sim \pi \rho f d \cos \beta \frac{P_A + P_B}{P_A - P_B} \exp j\left(\frac{\pi}{2} - \phi\right) \qquad (1)$$

where $f$ is the frequency, $\rho$ is the density of the medium, and $\beta$ indicates the angle of incidence of impinging plane-waves. The phase angle associated with the acoustic impedance is represented by $(\pi/2 - \phi)$ where $\phi$ is the relative phase difference between $(P_A + P_B)$ and $(P_A - P_B)$. Thus, in principle, by ratioing the sum and difference of the acoustic pressures measured simultaneously at two closely spaced locations in a sound field, one can obtain a quantity proportional to the magnitude of the specific acoustic impedance at the center of the two locations.

The magnitude of the specific acoustic impedance in Equation (1) can be rewritten in db scale as $20 \log |Z| - \log \pi \rho d = 20 \log f + \log (P_A + P_B)] - \log (P_A - P_B)$ (2) where the direction of the incident plane-wave is taken to be parallel to the axis of the device. Since in a given measurement, $20 \log \pi \rho d$ in Equation (2) is always constant, the instant invention has developed a system which produces an output proportional to the right hand side of this equation, thereby yielding the desired impedance magnitude as well as its associated phase angle.

The accuracy of the approach outlined hereinbefore for measuring the specific acoustic impedance depends critically on the separation between the two points of interest and on the size of the probe that measures simultaneously the acoustic pressures at these two points. Ideally, the separation should be short so that the validity of Equation (1) can be extended into higher frequency ranges; and additionally, the size of the device should be small so that its presence introduces negligible diffraction effects in the sound field. In practice, however, the separation of the two points of interest cannot be too small lest the difference in acoustic pressures measured at these two points may not be meaningful. Furthermore, the size of the acoustic pressure sensing device must not be so small that its sensitivity would be too low to detect any desired acoustic signals. Therefore, an acoustic impedance measuring device based on the approach as outlined here is as a matter of practice restricted to operation in a low-frequency range.

On the basis of the acoustic pressure sum and difference approach outlined above, a specific system for measuring various acoustic quantities is disclosed in the specific embodiment described in the following description. This system consists essentially of a small, probe-type, underwater device for measuring two acoustic pressures simultaneously and an associated electronic instrumentation system for processing the outputs of the device.

Referring to FIG. 1 an acoustic-pressure sensing device 10 is illustrated. This sensing device is essentially a dual-sensor hydrophone in which there are spaced apart two perfectly matched piezoelectric, pressure sensing, ceramic elements 11 and 12 in such a manner that they are completely electrically isolated for each other. Said pressure sensing elements are hollow cylinders which are rigidly mounted side-by-side and spaced apart on a cylindrical sleeve 13. Output leads 14 and 15 are attached to piezoelectric elements 11 and 12 respectively and both leads extend out of one end of said sensing device. A coating material 16 covers the entire sensing device and acts as insulation. An example of such a coating is rho-c material which provides insulation for underwater use.

By way of example, said sensing device can be of the following dimensions and characteristics. Both pressure sensing elements are ⅝ inch in length, 1/16 inch in wall thickness and ⅝ inch in outer diameter. The separation between the acoustic centers of said sensing elements is 2 inches. The overall dimensions of said sensing device are 11/16 inch in outer diameter and 4 inches in length. Additionally, both sensing elements have high electrical capacitance (6,800 picofarads) and their sensitivities ($-105$ db re $1v/\mu$ bar) are matched to within ¼ db over the frequency range from 50 Hz to 3,000 Hz.

Figure 2:
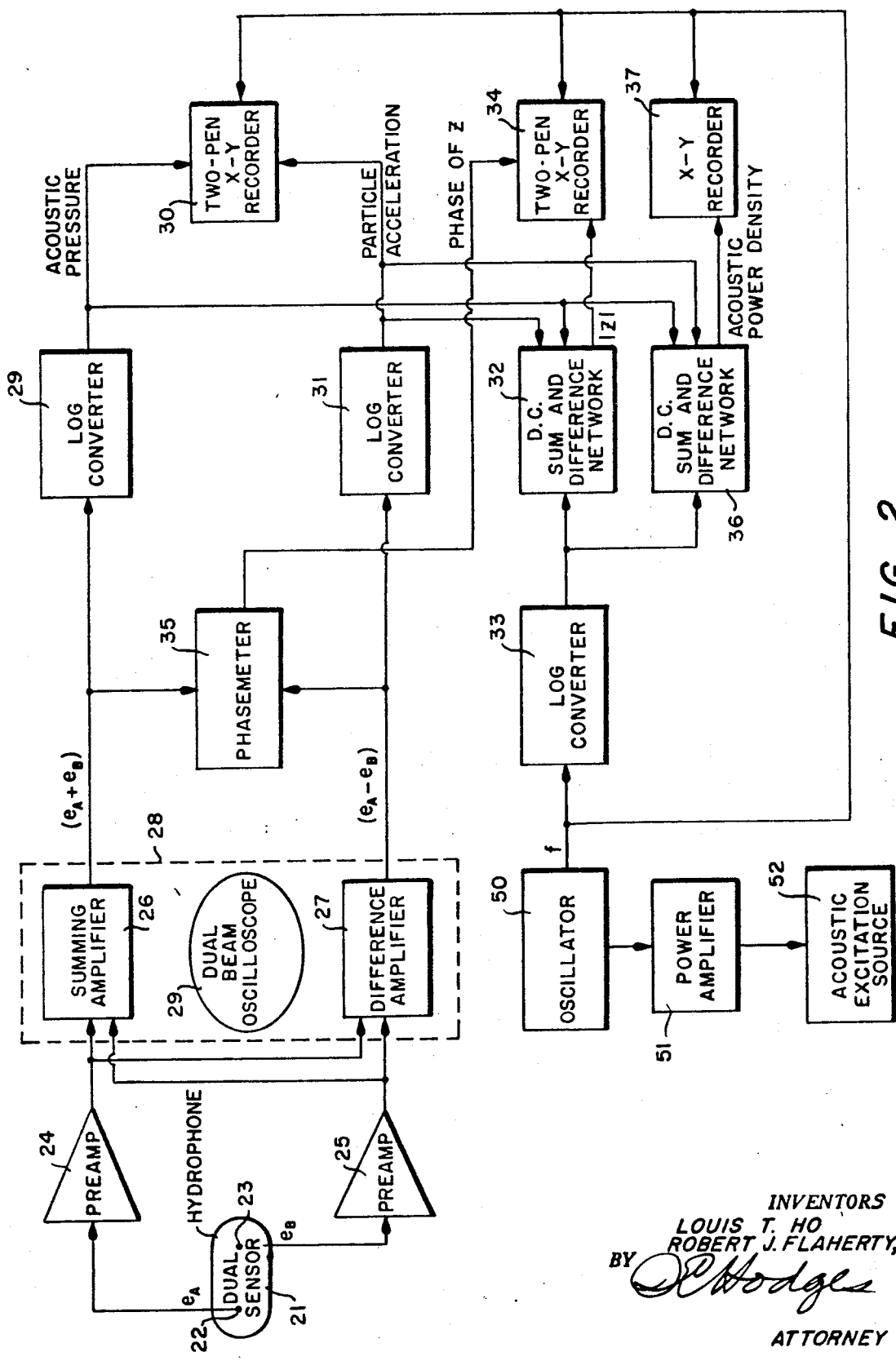
FIG. 2 illustrates in schematic form an electrical system for obtaining various acoustic quantities in a fluid medium.

The associated electrical system for obtaining various acoustic quantities in a fluid system is shown in schematic form in FIG. 2. Hydrophone 21 is similar to the acoustic-pressure sensing device illustrated in FIG. 1. The hydrophone contains dual sensors 22 and 23, which produce output voltage signals $e_A$ and $e_B$ respectively. The sensors should preferably have the same frequency response. Signal $e_A$ is fed into preamplifier 24 and signal $e_B$ is fed into preamplifier 25. These amplifiers are matched in their electrical characteristics and equipped with a continuous, variable gain control device that enables one to perfectly match the magnitudes of the two voltage signals. An acceptable preamplifier is Model 112M21 manufactured by Ithaco.

The amplified signals $e_A$ and $e_B$ are then summed and differenced respectively in summing amplifier 26 and difference amplifier 27. Amplifier 26 may be a Tektronix plug-in, Type 3A72 while amplifier 27 may be a Tektronix plug-in, Type 3A3. Both amplifiers are incorporated in a compact unit 28 which includes a dual beam oscilloscope, 29, such as Tektronix, Type 565, for displaying separate signals. The two amplifiers 26 and 27 should be adjusted at the time of construction so that their electrical characteristics remain identical in the frequency range of operation (50 Hz to 2,000 Hz). Four signals, namely: $e_A$; $e_B$; $(e_A + e_B)$; and $(e_A - e_B)$, can be monitored on the oscilloscope and, if needed, additional amplification can be obtained from amplifiers 26 and 27. Thus, the summing amplifier produces output signal $(e_A + e_B)$ while the difference amplifier produces output signal $(e_A - e_B)$.

The sum $(e_A + e_B)$ and difference $(e_A - e_B)$ signals are then processed to yield various acoustic quantities of the fluid medium under study, namely: sound pressure, particle acceleration; specific acoustic impedance; and acoustic power density in the medium, all of which are measured relative to a point corresponding to the center of separation between sensors 22 and 23 in hydrophone 21. The circuitry for obtaining these quantities is also illustrated in FIG. 2 and the procedure for obtaining these quantities is outlined below:

I. ACOUSTIC PRESSURE

The acoustic pressure P at the center of separation d between two points A and B in a plane wave sound field is represented by the following formula:

$$P \approx (P_A + P_B)/2. \qquad (3)$$

provided that $kd \ll 1$ where $k$ is the wave number in the sound field. Thus, to obtain a quantity corresponding to the acoustic pressure, the sum signal $(e_A + e_B)$ from summing amplifier 26 is converted into a d.c. signal, $\log (e_A + e_B)$, by feeding it into log converter 29, such as Hewlett-Packard log converter Model 7561A. The d.c. signal is then plotted out in db scale as a function of frequency in a two-pen recorder 30 such as Mosely Model 136A, to yield an acoustic pressure vs. frequency graph.

The particular frequency function against which the acoustic pressure is plotted is the driving frequency of oscillator 50, such as Spectral Dynamics Model SD 102-20. This oscillator 50 provides a sinusoidal voltage which is fed through power amplifier 51 to drive an acoustic excitation source 52. This excitation source is positioned in the field medium under study and acts as a source standard producing acoustic signals at a particular driving frequency controlled by oscillator 50.

II. PARTICLE ACCELERATION

The normal component of the particle acceleration at the center of separation d between points A and B in a plane wave sound field is represented as follows:

$$a \approx (P_A - P_B)/\rho d \text{ for } kd \ll 1 \qquad (4)$$

Thus, to obtain a quantity corresponding to the particle acceleration in the medium, the difference signal $(e_A - e_B)$ from difference amplifier 27 is converted into a d.c. signal, $\log (e_A - e_B)$, by feeding it into log converter Model 7561A, which is then plotted out in db scale on recorder 30, such as Mosely Model 136A, as a function of the driving frequency to yield a particle acceleration vs. frequency plot.

III. ACOUSTIC IMPEDANCE

In terms of the acoustic pressures measured at points A and B in a plane-wave sound field, the specific acoustic impedance at the center of separation $d$ between A and B can be expressed as follows:

$$Z \sim \pi \rho d f \frac{P_A + P_B}{P_A - P_B} \exp j(\pi/2 - \phi) \quad (5)$$

where $\rho$ is the density of the medium and $\phi$ is the relative phase difference between $(P_A + P_B)$ and $(P_A - P_B)$. Thus, to obtain the magnitude of the acoustic impedance, the log $(e_A + e_B)$ signal from log converter 29 is fed into one of three inputs in d.c. sum and difference network 32. This network is shown in greater detail in FIG. 3a. To a second input of network 32 is fed the log $(e_A - e_B)$ signal from log converter 31. The third input is connected to yet a different log converter 33, which converts a signal, $f$, from oscillator 50 that is proportional to the driving frequency into a d.c. logarithmic signal, log $f$. The output from network 32 represents the magnitude of the acoustic impedance, log $f$ $$\frac{e_A + e_B}{e_A - e_B}$$

and is plotted as a function of the driving frequency in a two-pen recorder 34, such as Mosely Model 136A.

To obtain the phase angle associated with the impedance, the sum signal $(e_A + e_B)$ and the difference signal $(e_A - e_B)$ are fed into a phasemeter 35, such as AD-YU Model 405-L. The output from phasemeter 35, a d.c. signal proportional to the phase difference between $(e_A + e_B)$ and $(e_A - e_B)$, is fed to recorder 34 and plotted out separately from but simultaneously with the impedance magnitude.

IV. ACOUSTIC POWER DENSITY

In terms of the acoustic pressures P at points A and B separated by a small distance d in a plane-wave sound field, the acoustic power density (energy per unit area per unit time) at the center of the separation along the direction of wave propagation can be shown as follows:

$$E \sim \frac{(P_A + P_B)(P_A - P_B)}{4\pi j \rho d f} \quad (6)$$

where $\rho$ is the density of the fluid medium and $f$ is the frequency of the sound waves. Thus to obtain the acoustic power density, a procedure is used which is very similar to that used to determine acoustic impedance magnitude. Accordingly, d.c. sum and difference network 36 is the same as network 32, and the input signals for both networks are log $(e_A + e_B)$, log $(e_A - e_B)$ and log $f$. The difference between networks 32 and 36 is the manner in which the three input leads are connected and this is shown in detail in FIG. 3b. The output signal from network 36 is proportional to the acoustic power density and is fed to a recorder 37, where acoustic power density is displayed as a function of the driving frequency.

Figure 3A:
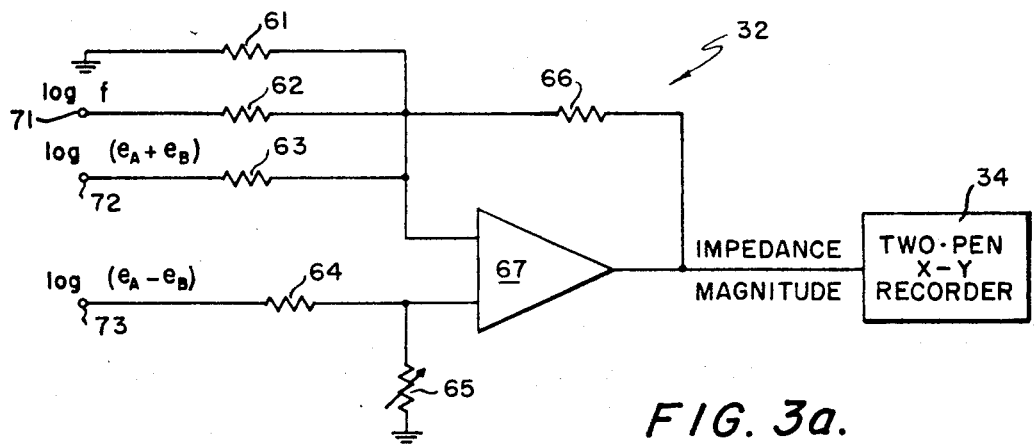
FIG. 3a illustrates in detail the d.c. sum and difference network depicted in FIG. 2 which produces an output voltage proportional to the magnitude of the acoustic impedance.
Figure 3B:
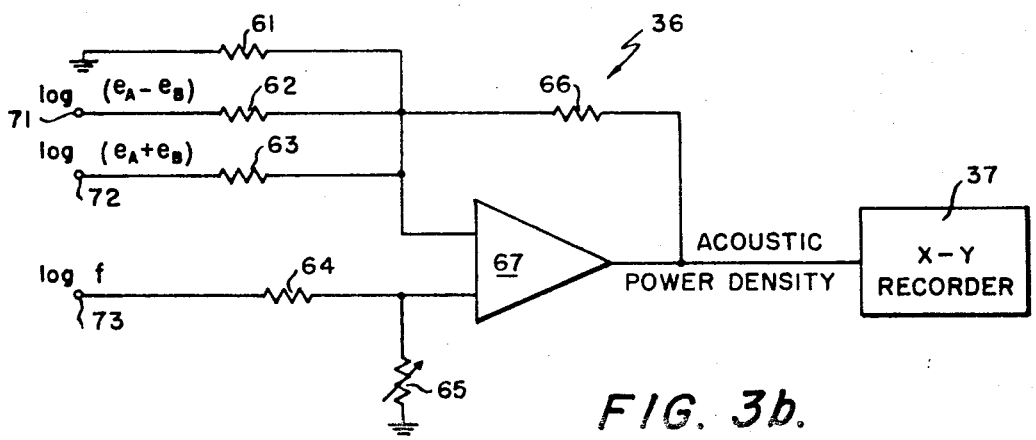
FIG. 3b illustrates in detail the d.c. sum and difference network depicted in FIG. 2 which produces an output voltage proportional to the acoustic power density.

FIGS. 3a and 3b represent networks 32 and 36 respectively and are substantially similar except for their input signals. Basically the two circuits comprise exactly the same circuitry and therefore can be described by using the same numerical designations. Three resistances 61, 62 and 63 at a first end are connected to a common first input of an operational amplifier 67, such as Philbrick P85AU. A resistance 64 is connected at a first end to a second input of amplifier 67. Variable resistance 65 is also connected to the second input of amplifier 67 and then grounded. The output of amplifier 67 is attached to recorder 34 in FIG. 3 and to recorder 37 in FIG. 3b. In addition, resistance 66 is attached between the first end of resistance 62 and the output of amplifier 67. Finally, resistance 61 at its second end is grounded, resistance 62 at its second end is attached to contact 71, resistance 63 at its second end is attached to contact 72 and resistance 64 at its second end is attached to contact 73. Thus far the two circuits are exactly the same.

The differences between FIGS. 3a and 3b are in the input signals which are fed through contacts 71, 72 and 73. In FIG. 3a log $f$ signal appears at 71, log $(e_A + e_B)$ appears at 72 and log $(e_A - e_B)$ appears at 73. Because of this input signal arrangement, network 32 produces an output signal proportional to acoustic impedance magnitude. In FIG. 3b log $(e_A - e_B)$ signal appears at 71, log $(e_A + e_B)$ appears at 72 and log $f$ appears at 73. Because of this input signal arrangement, network 36 produces an output signal proportional to acoustic power density.

By way of example the following components could be employed in the d.c. sum and difference networks 32 and 36: Resistors 61 = 44.07K ±0.3 percent, 62 = 25K ±0.2 percent, 63 = 25K ±0.2 percent, 64 = 25K ±0.2 percent, 65 = 50K rheostat and 66 = 50K ±0.4 percent, and amplifier 67 a Philbrick Model P85AU.

Figure 4:
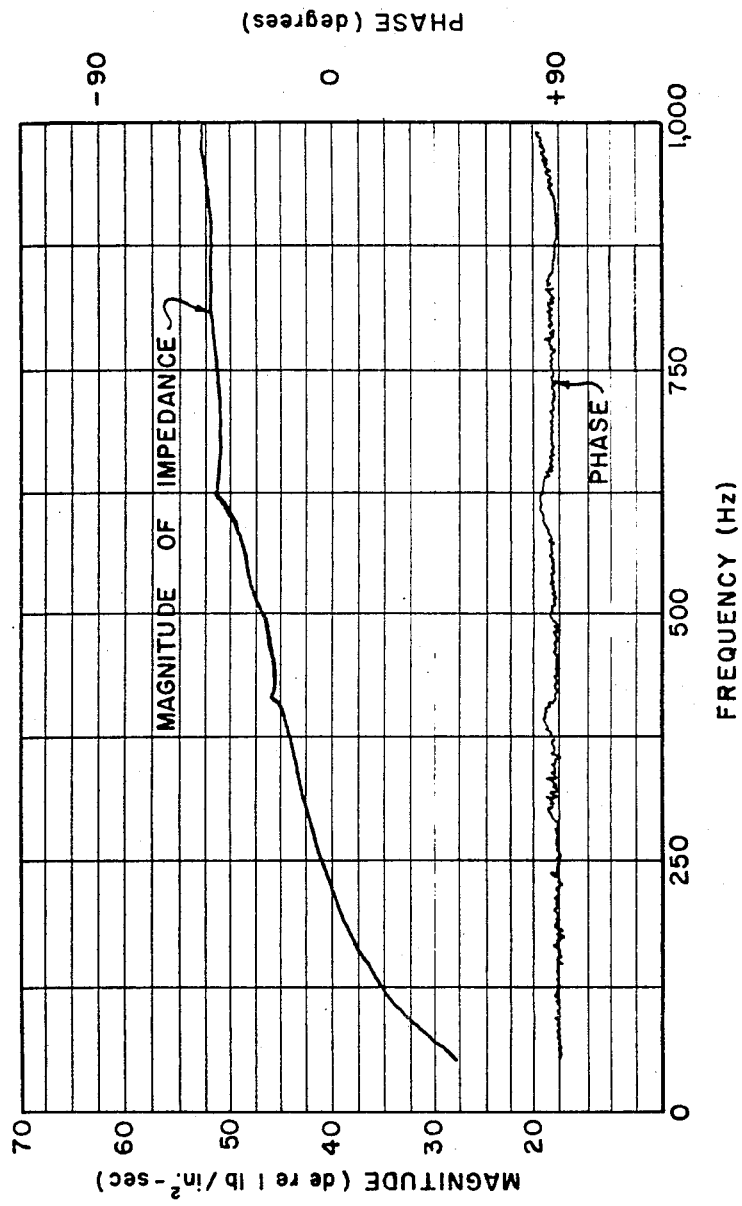
FIG. 4 illustrates in graphical form a typical plot of the magnitude and phase angle of acoustic impedance vs. the driving frequency.

The remaining figure, FIG. 4, is an example of an actual display which would appear at recorder 34 and depicts both magnitude and phase angle of the acoustic impedance.

Therefore, the instrumentation system disclosed hereinbefore is capable of providing instantly and simultaneously graphs of acoustic pressure, particle acceleration, acoustic impedance and acoustic power density, all of which are displayed as a function of the driving frequency of an excitation source in the fluid medium being studied.

In addition, the invention could also be used in the area of determining the dynamic viscosity of a fluid. Once the acoustic impedance data of a fluid specimen is known, then the dynamic viscosity can be calculated from the following formula:

$$\eta = \frac{RX}{\rho \pi f} \quad (7)$$

where $R$ and $X$ are, respectively, the resistive and reactive components of the acoustic impedance.

Lastly, the scope of the instant invention is not limited to the specific embodiment presented, but rather includes other embodiments incorporating the principles of this invention which would be obvious to those skilled in the acoustic art.

Obviously, many modifications and variations of the present invention are possible in the light of the above teachings. It is therefore to be understood that within the scope of the appended claims the invention may be practiced otherwise than as specifically described.

What is claimed is:

1. A method for determining certain acoustic characteristics of a fluid medium instantly and simultaneously comprising:

oscillating an acoustic source positioned in said medium at a predetermined frequency;

sensing the pressure produced by said acoustic source at two points A and B in said medium separated by a small distance;

producing output voltages $e_A$ and $e_B$ related to said sensed pressures at points A and B respectively;

summing said voltages $e_A$ and $e_B$ and thereby producing output voltage $(e_A + e_B)$;

differencing said voltages $e_A$ and $e_B$ and thereby producing output voltage $(e_A - e_B)$;

converting said voltages $(e_A + e_B)$ and $(e_A - e_B)$ separately to d.c. logarithmic equivalent voltages log $(e_A + e_B)$ and log $(e_A - e_B)$ respectively;

displaying voltages log $(e_A + e_B)$ and log $(e_A - e_B)$ separately as functions of said oscillating acoustic source frequency and thereby producing simultaneous displays of acoustic pressure and particle acceleration, respectively;

producing a voltage $e_F$ related to the frequency of said oscillating acoustic source;

converting said voltage $e_F$ to a d.c. logrithmic equivalent voltage log $e_F$;

applying said voltages log $e_F$, log $(e_A + e_B)$ and log $(e_A - e_B)$ as inputs to a first d.c. sum and difference network in a manner whereby output voltage log $$f = \frac{e_A + e_B}{e_A - e_B}$$

is produced;

applying the voltages $(e_A + e_B)$ and $(e_A - e_B)$ as inputs to a phasemeter thereby producing an output voltage $e\phi$ related to the phase angle difference between these voltages; and displaying the voltages log $$f = \frac{e_A + e_B}{e_A - e_B}$$

and $e\phi$ separately as functions of said oscillating acoustic source frequency and thereby producing simultaneously with said displays of acoustic pressure and particle acceleration, displays of the magnitude of acoustic impedance and the acoustic impedance phase angle.

2. The method of determining certain acoustic characteristics of a fluid medium as recited in claim 1, further comprising the steps of:

applying said voltages log $e_f$, log $(e_A + e_B)$ and log $(e_A - e_B)$ as inputs to a second d.c. sum and difference network in a manner whereby output voltage log $$\frac{(e_A + e_B)(e_A - e_B)}{f}$$

is produced; and
displaying said voltage log $$\frac{(e_A + e_B)(e_A - e_B)}{f}$$

as a function of said oscillating acoustic source frequency and thereby producing simultaneously with said displays of acoustic pressure, particle acceleration, acoustic impedance magnitude and acoustic impedance phase angle a display of acoustic power density.

3. A device for measuring and displaying different acoustic characteristics of a fluid medium, comprising:

an acoustic excitation source for producing standard acoustic signals in said fluid medium at a predetermined driving frequency;

an oscillator connected to said excitation source for driving said source at said predetermined driving frequency;

a dual sensor hydrophone positioned in said fluid medium for determining the pressure produced by said oscillating acoustic source;

a first amplifier connected to one of said pressure sensors and a second amplifier connected to the other pressure sensor;

a summing amplifier connected to both said first and second amplifiers;

a differencing amplifier connected to both said first and second amplifiers;

first and second log converters connected to said summing and differencing amplifiers respectfully; and a first display means connected to said first log converter, said second log converter and said oscillator for displaying acoustic pressure and particle acceleration as functions of said driving frequency simultaneously.

4. A device for measuring and displaying different acoustic characteristics of a fluid medium as recited in claim 3, further comprising:

a third log converter connected to said oscillator;

a first d.c. sum and difference network containing three input terminals, said third log converter connected to said first input terminal, said first log converter connected to said second input terminal and said second log converter connected to said third input terminal;

a phasemeter connected to both said summing amplifier and said differencing amplifier; and a second display means connected to said first d.c. sum and difference network, said phasemeter and said oscillator for displaying acoustic impedance magnitude an acoustic impedance and angle as functions of said driving frequency simultaneously with each other and with said displays of acoustic pressure and particle acceleration.

5. A device for measuring and displaying difference acoustic characteristics of a fluid medium as recited in claim 4, further comprising;

a second d.c. sum and difference network substantially the same as said first network and containing three input terminals, said second log converter connected to said first input terminal, said first log converter connected to said second input terminal and said third log converter connected to said third input terminal; and a third display means connected to both said second d.c. sum and difference network and said oscillator for displaying acoustic power density as a function of said driving frequency simultaneously with said displays of acoustic pressure, particle acceleration, acoustic impedance magnitude and acoustic impedance phase angle.

* * * * *